F. F. FISCHER.
OPERA CHAIR.
APPLICATION FILED JUNE 20, 1918.
1,290,532. Patented Jan. 7, 1919.
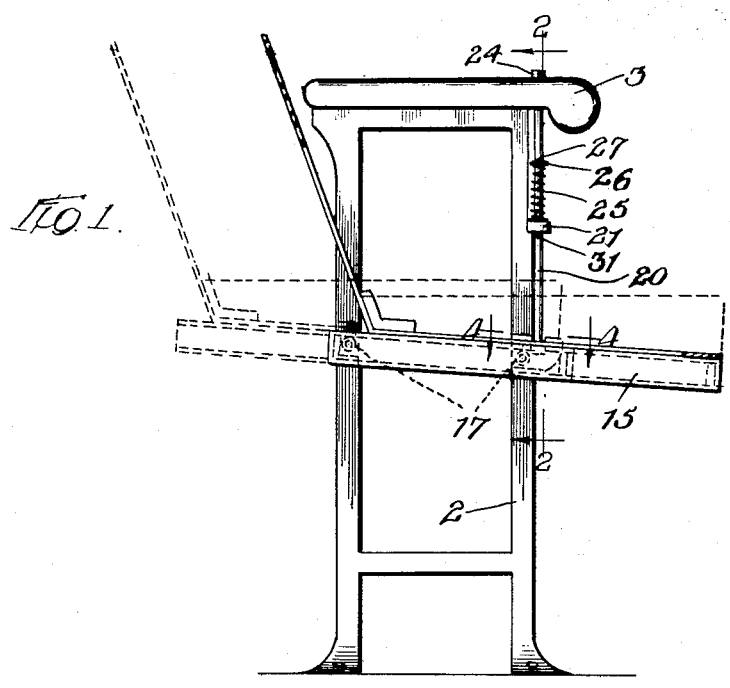
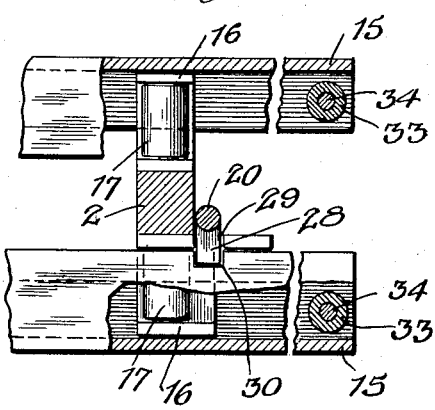
Inventor
Frank F. Fischer.
By Mason Fenwick & Lawrence,
Attys.

UNITED STATES PATENT OFFICE.

FRANK F. FISCHER, OF HAYES CENTER, NEBRASKA.

OPERA-CHAIR.

1,290,532.  Specification of Letters Patent.  Patented Jan. 7, 1919.

Application filed June 20, 1918. Serial No. 241,038.

*To all whom it may concern:*

Be it known that I, FRANK F. FISCHER, a citizen of the United States, residing at Hayes Center, in the county of Hayes and State of Nebraska, have invented certain new and useful Improvements in Opera-Chairs; and I do hereby declare the following to be a full, clear, and exact description of the invention, such as will enable others skilled in the art to which it appertains to make and use the same.

This invention relates to opera chairs, and more particularly to that type of chair having a horizontally slidable seat structure, such for instance as is shown in my Patent No. 1,247,521, dated Nov. 20, 1917, and it is an object of the present invention to improve the chair illustrated in the said patent by the provision of means for automatically locking the chair seat as the latter is advanced from the rearmost to its foremost position for use.

It is a further object of the invention to provide a simple, practicable, inexpensive, reliable and quickly acting locking means, and to provide such a means as may be readily released when it is desired to unlock the chair so as to enable it to be shifted back to its rearmost position.

With this and other objects in view as will be rendered manifest in the following specification, the invention consists of the construction, the combination, and in details and arrangements of the parts as more particularly hereinafter described in reference to an embodiment of the invention, in which—

Figure 1 is an elevational view of the improved chair partly broken away, showing the seat in its forward and locked position;

Fig. 2 is a section on line 2—2 of Fig. 1 looking in the direction of the arrows;

Fig. 3 is an enlarged cross sectional detail of the seat mounting and one of the legs;

Fig. 4 is a partial plan and partial sectional view of the sliding chair bars together with the lock;

Fig. 5 is a longitudinal section through one of the chair side bars showing the detachable bumper device.

In my patent above referred to, the chair consisted of a sliding seat carrying or having side bars in the form of channel irons which are designated in the present drawings at 15, one at each side of the chair seat, which is not shown in the present instance, the flanges of the channel irons or side bars being directed outwardly from the seat and embracing respective horizontal angular supports designated 16 appropriately secured to vertical legs or frames indicated at 2. These supports 16 are here provided with horizontal rollers 17 upon which slide the upper flanges of the channel side bars 15 during the movement of the chair seat rearwardly or forwardly as may be desired.

The particular feature of the present invention resides in the provision of means for locking the chair seat when it is projected forward as is illustrated in Fig. 1, and preferably resides in the provision of automatic means for locking the chair seat in its forward position. In the accomplishment of this purpose a simple and practical form of lock consists of a vertically disposed rod 20 guided in suitable bearings 21 and 22, the upper for instance being in the arm 3 of the chair frame, the upper end of the locking rod or pin 20 carrying a push button 24 fitting the aperture provided therefor in the arm 3 and projecting slightly above the top of the arm when in the normal upwardly projecting position. The locking rod or pin 20 is provided with suitable means for projecting it upwardly to the desired position and comprising for instance a spring 25 surrounding a portion of the rod, the spring bearing at its lower end against the lower bearing 21 and at its upper end against a washer 26 positioned against a cotter or other pin 27 in the rod 20. The lower end of the rod is shown as provided with a lug or foot 28 obtained by bending the end of the rod angularly, this portion being guided in a slot 29 provided therefor in the supporting piece 16 attached to the leg frame 2. The side bar or channel member 15 of the seat frame which is adjacent to the locking pin 20 as shown in Figs. 2 and 4 is provided with a shoulder which may be obtained by making a notch 30 therein at such position in the length of the channel bar that when the seat frame or structure is projected forwardly as in Fig. 1 the foot or locking lug 28 will spring into the path of the shoulder or into the slot 30, the upward movement of the pin or rod 20 being determined by a suitable stop as a cotter pin 31 designed to engage the lower surface for instance of the bearing 21.

When it is desired to release the chair from the locking rod or pin 20, it is only necessary to depress the button 24 which moves the locking lug 28 from engagement with the adjacent channel bar 15, whereupon the seat frame can be pushed rearwardly readily. As soon as pressure is released from the push button 24, and when the seat frame has been shifted rearwardly just sufficiently to carry the notch beyond the locking lug 28, then the latter will spring upwardly against the overhanging top flange of the channel or side bar 15 and remain there in readiness to snap into locking engagement as soon as the seat frame has again been shifted to its forward position and the slot 30 registers with the locking lug 28.

The channel irons or side bars 15 of the seat frame are shown in Fig. 5 provided with cushion rolls or bumpers 33, one of which is mounted on a pin 34 which is shown as riveted over as at 35 making a permanent connection but to permit the entire removal of the seat frame from the leg frame it is desirable to remove one of the bumpers 33 and therefore this one is mounted on a screw 36, Fig. 5 passing through the bumper and engaging complementary threads 37 in the opposite flange of the channel member.

By the utilization of chairs of this construction provided with automatic locking machines, it will be seen that when the chairs are arranged in a row in an auditorium in which there are successive rows that all of the chairs will be locked when they are projected forwardly, and for this reason the liability of injury to members of the audience is eliminated by preventing the free pushing back of the protected seats upon the occupant of the seat rising to his feet. This is important, because in case of panic from any cause, the seats which have been projected forwardly are held with their front edges in alinement and therefore members of the audience passing along the front of the seats are prevented from violently knocking against the side edge of a seat as would be possible if the seats were not locked and could be readily pushed back. If one of the seats is unlocked and pushed back from one row into the row beyond, the person in the rear row simply has to push forwardly on the seat when it will become automatically locked again.

What is claimed is:

1. An opera or other chair comprising leg frames, a seat structure having channel bars slidably supported upon the frames, means engaging one of the bars to automatically lock the seat in forward position, one of the flanges of the bar having a shoulder, and said means comprising a manual rod normally acting to move into the path of said shoulder.

2. An opera or other chair comprising leg frames, a seat structure having channel bars slidably supported upon the frames, means engaging one of the bars to automatically lock the seat in forward position, said means including a manual rod and means for yieldingly pressing the rod toward locking position.

3. An opera or other chair comprising leg frames, a seat structure having channel bars slidably supported upon the frames, means engaging one of the bars to automatically lock the seat in forward position, said means including a manual rod and means for yieldingly pressing the rod toward locking position, the rod having a portion pressing against the adjacent side bar when the seat is retracted so that it will automatically interlock the seat at a given position.

In testimony whereof I affix my signature.

FRANK F. FISCHER.